Figure 1:
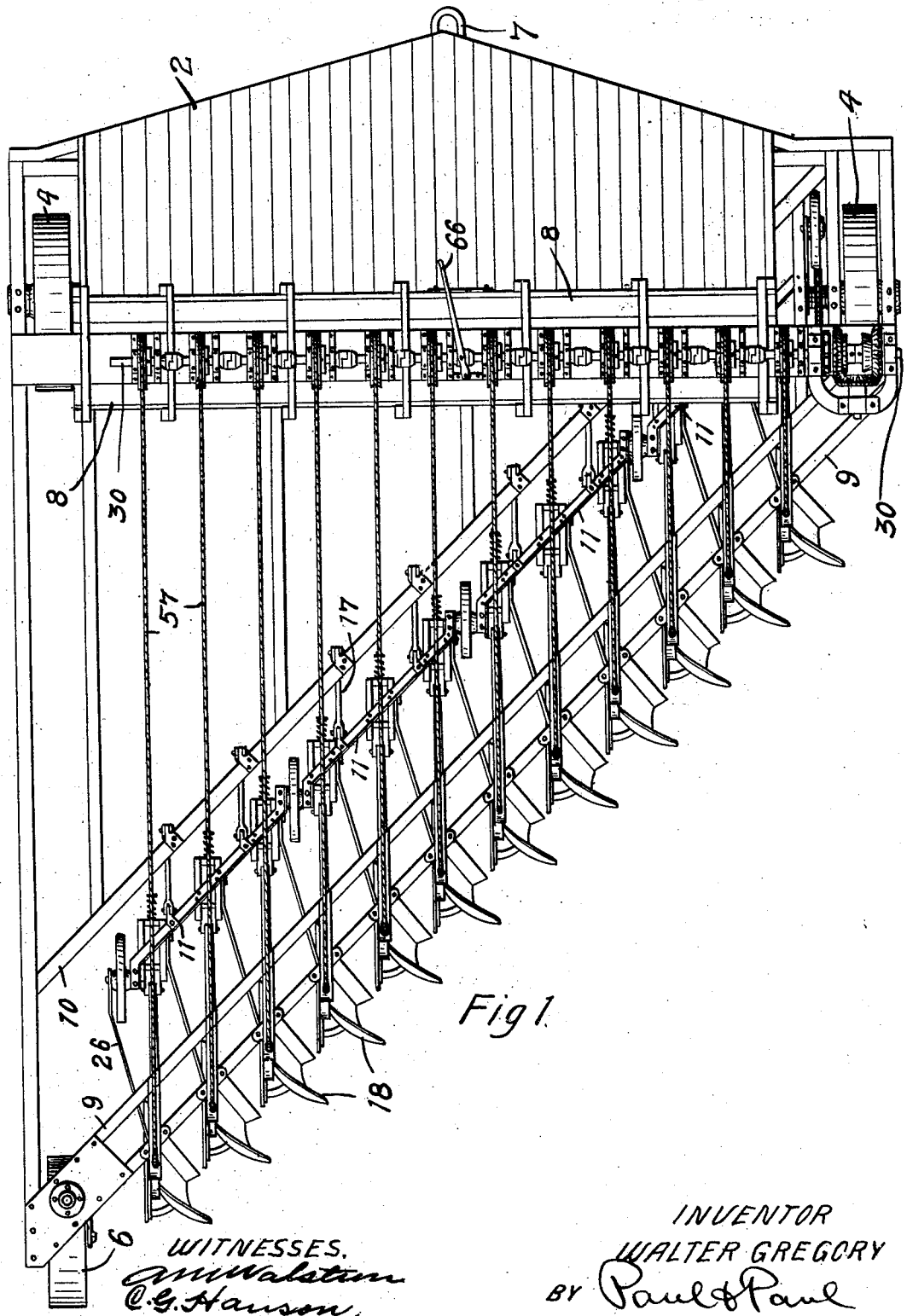

No. 819,423. PATENTED MAY 1, 1906.
W. GREGORY.
MEANS FOR OPERATING GANG PLOWS.
APPLICATION FILED AUG. 7, 1905.

4 SHEETS—SHEET 1.

WITNESSES.

INVENTOR
WALTER GREGORY
BY Paul & Paul
HIS ATTORNEYS.

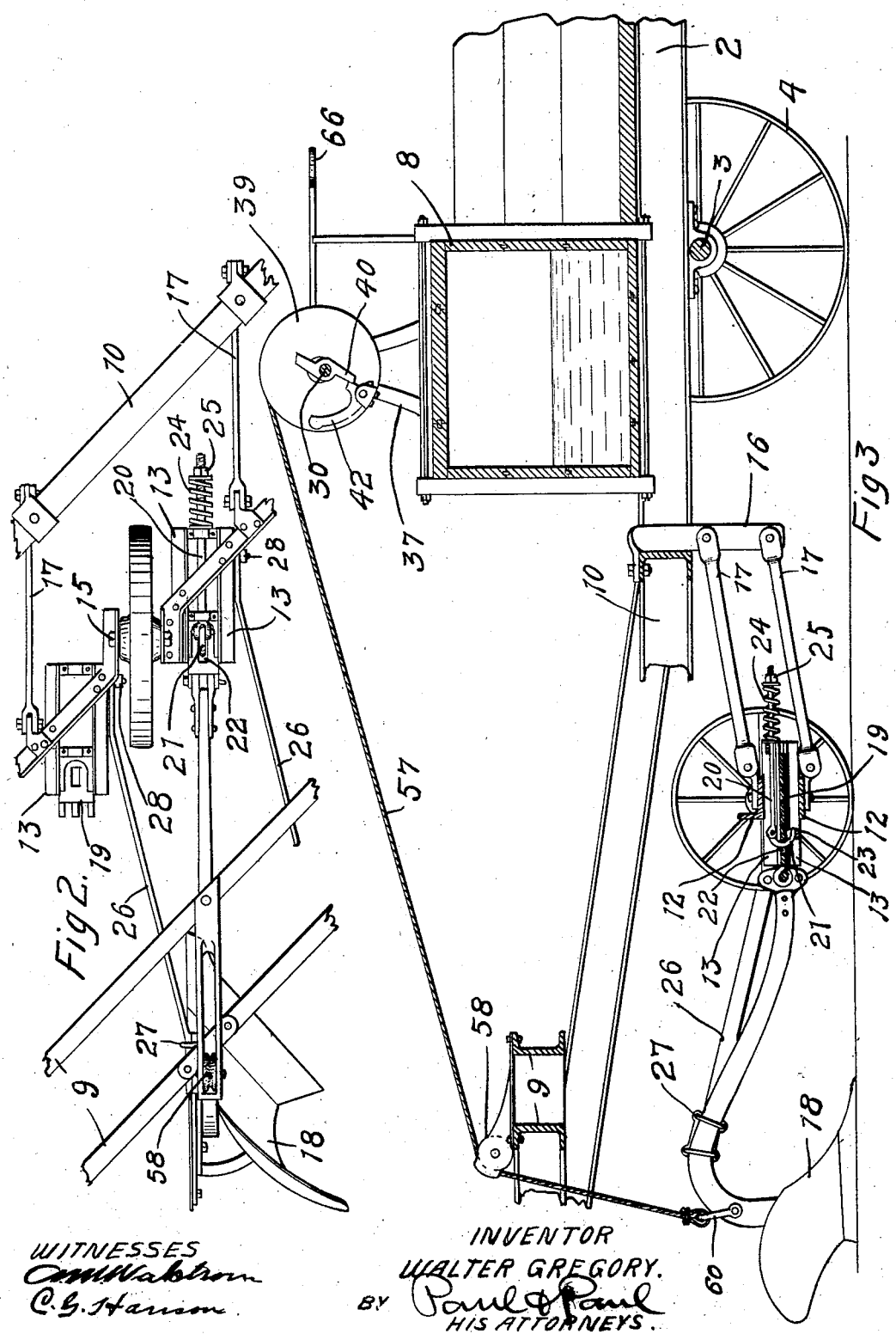

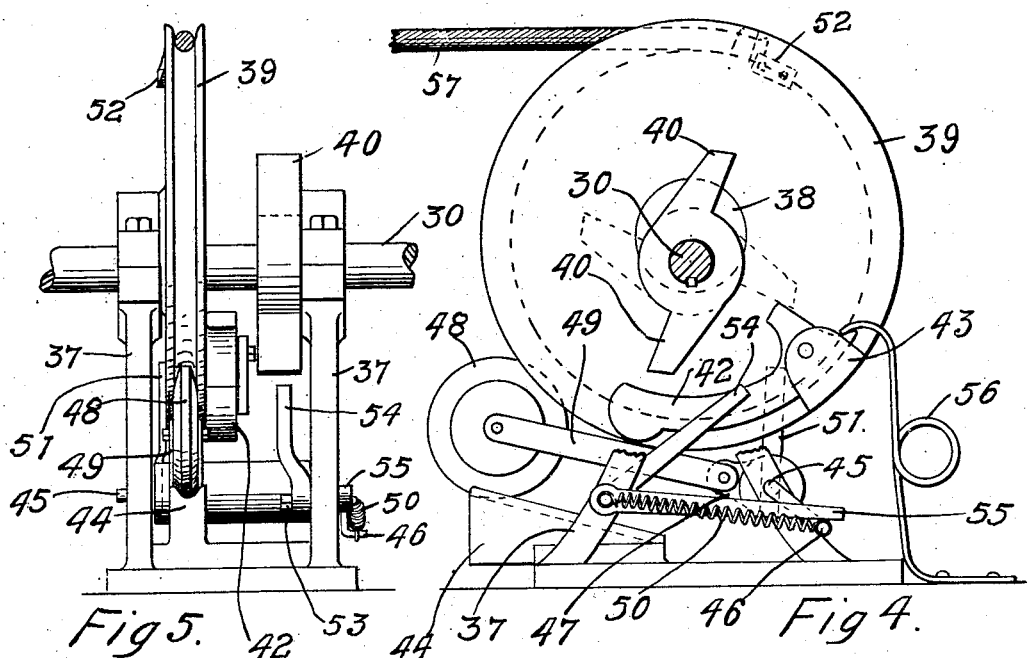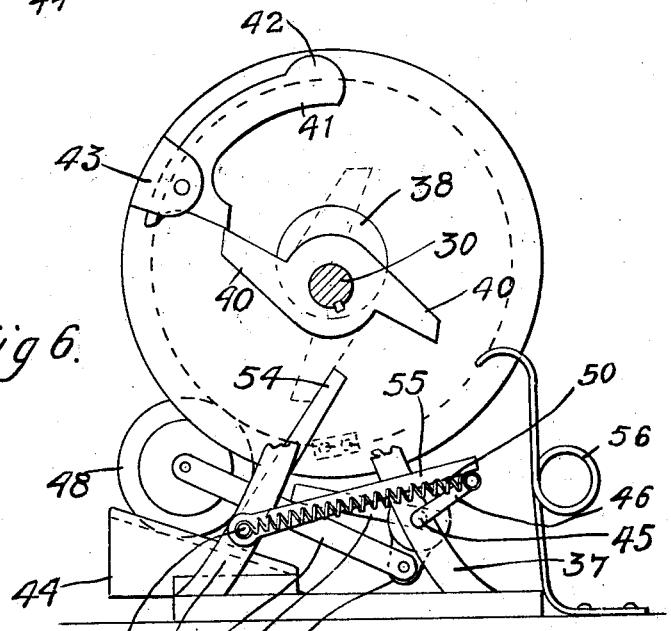

No. 819,423. PATENTED MAY 1, 1906.
W. GREGORY.
MEANS FOR OPERATING GANG PLOWS.
APPLICATION FILED AUG. 7, 1905.
4 SHEETS—SHEET 4.
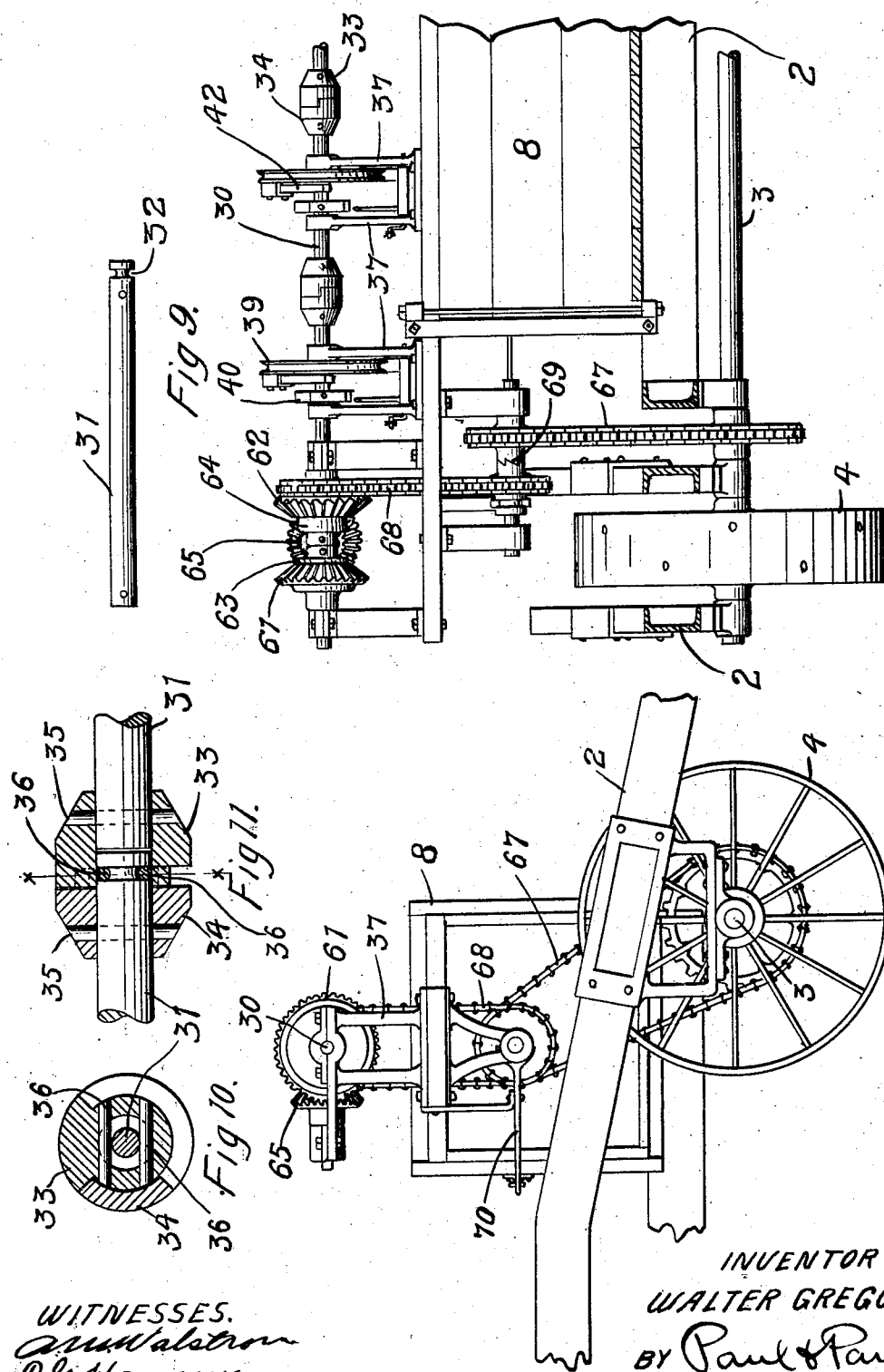
WITNESSES.
INVENTOR
WALTER GREGORY.
BY Paul & Paul
HIS ATTORNEYS.

UNITED STATES PATENT OFFICE.

WALTER GREGORY, OF MINNEAPOLIS, MINNESOTA.

MEANS FOR OPERATING GANG-PLOWS.

No. 819,423.　　　　Specification of Letters Patent.　　　　Patented May 1, 1906.

Application filed August 7, 1905. Serial No. 273,024.

*To all whom it may concern:*

Be it known that I, WALTER GREGORY, of Minneapolis, Hennepin county, Minnesota, have invented certain new and useful Improvements in Means for Operating Gang-Plows, of which the following is a specification.

This invention relates to improvements in gang-plows, and preferably to such plows as are drawn by a traction-engine.

The object I have in view is to provide means whereby the plows may be raised in succession one after another when the gang of plows reaches the end of the field being plowed, whereby the furrows will all end on the same line.

The invention consists generally in providing a gang of plows with means for raising said plows one after another.

The invention consists, further, in the constructions and combinations hereinafter described, and particularly pointed out in the claims.

In the accompanying drawings, forming part of this specification, Figure 1 is a plan view of a gang of plows embodying my invention. Fig. 2 is a detail plan view, on a larger scale, showing one of the plows and the means for connecting the operating mechanism. Fig. 3 is a side elevation of one of the plows and the means for raising and lowering the same. Fig. 4 is a detail side elevation showing the lifting device when out of operation. Fig. 5 is an end elevation of the parts shown in Fig. 4. Fig. 6 is a detail side elevation of the parts shown in Fig. 4, but shown in the act of raising a plow. Fig. 7 is a detail side elevation of the means for operating the lifting devices. Fig. 8 is an end elevation of the same. Fig. 9 is an elevation of one of the short shafts. Figs. 10 and 11 are details of the couplings.

In the drawings, 2 represents a suitable frame or platform, preferably of substantially triangular form mounted upon a suitable axle 3, supported upon driving-wheels 4. The rear of the frame is provided with a suitable supporting-wheel 6. This platform and its supporting axle and wheels form a carriage adapted to be hauled across the field to be plowed by a traction-engine or other suitable means, the carriage being provided at its forward end for the purpose of coupling it with a traction-engine with a suitable coupling 7. If preferred, a water-tank 8 for the engine may be mounted upon this carriage, or the carriage may be used for transporting anything that it is desired to use in connection with the engine or plows. The platform is provided with the parallel bars or beams 9 and 10, which form a part of said platform and also provide a draft-bar for the series of plows. Arranged in the rear of the beam 10 are the carriages 11, preferably four in number, and each consisting of the parallel bars 12 12, between which are arranged the guide and coupling plates 13. The upper bar 12 is preferably formed of angle-iron with its ends turned so as to extend parallel with the plow-beam, and wheels 14 are mounted to turn freely on short shafts 15, secured in the ends of said bars. By this means the carriages 11 are flexibly connected together and are adapted to adjust themselves to uneven surfaces of the ground upon which the machine is used. The beam 10 is provided with a depending standard 16, and connecting-rods 17 are pivoted to said standards and also to the carriage-bars 12. These connecting-rods are preferably attached near each end of each carriage, and by this means said carriages are drawn over the ground with the frame or platform 2. I provide a series of plows 18, which may be of any usual or preferred construction. Any number of said plows may be employed with one machine. I have shown twelve plows connected to a single platform; but more or less may be used, as preferred. The forward end of each plow-beam is pivotally connected to a plate 19, adapted to slide between the guide and coupling plates 13. For the purpose of releasably connecting said plates to the carriages 11 I provide a coupling-rod 20, having a hook 21 adapted to pass through an opening 22 in the plate 19 and to have its free end engaged with a lug 23 on the carriage. The other end of the coupling-rod 20 is provided with a spring 24, which bears against the carriage, while its opposite end is engaged by a nut 25, adjustably arranged on the end of the coupling-rod. When the parts are in the position shown in Fig. 3 of the drawings, the plow 18 is coupled to the carriage 11 and will remain so coupled so long as the strain upon the plow does not overcome the tension of the spring 24. Should the plow strike a stone or other obstruction, the spring 24 will yield, and if the resistance caused by such obstruction is greater than the tension of the spring 24 the coupling-rod will slide in its bearings until the end of the hook 21 is disengaged from the lug 23, when the hook will fly out of the hole 22 and the plow will be released. By this means the danger of breaking plows when they strike stones or other obstructions is overcome.

For the purpose of bracing each plow so as to prevent it from being swung toward the land, I provide a brace-bar 26, which has its rear end secured to the plow-beam by a clamp 27, and its slotted forward end engages a bolt 28 upon one of the carriages 11. This bolt is preferably arranged upon the next succeeding guide and coupling plate 13. (See Fig. 2.) In each instance I have shown the brace-bar 26 so arranged except in connection with the last plow of the series, and in this case the forward end of the brace-bar 26 is engaged with the axle 15 of the last carriage-wheel 14. (See Fig. 1.)

The means that I prefer to employ for raising the plows in succession one after another, so that the ends of furrows will all be even or in line with one another, are preferably driven from one of the platform-wheels and consists, essentially, of a series of "pickups" which lift or pick up the plows in succession, one after another, the interval between the lifting of one plow and the lifting of the succeeding plow being sufficient to cause said plows to be raised at the same point over the surface of the ground, thereby causing the ends of the furrows to all be substantially in line one with another.

Mounted in suitable standards upon the frame of the machine is a rotatable shaft consisting of a series of short shaft-sections arranged in line with one another and coupled together, so that as the first section is rotated it will make a half-revolution, more or less, before the next section begins to rotate, and so on throughout the series. In the drawings I designate the shaft as a whole by the reference-figure 30 and each of the sections (see Fig. 9) by the reference-figure 31. Each section is provided near one end with an annular recess or groove 32 and the meeting ends of the sections are provided with the coupling-sections 33 and 34, secured to the ends of the shaft-section by suitable pins 35. Pins 36 pass through the coupling-section 35 and engage the annular groove in the next succeeding shaft-section. (See Figs. 10 and 11.) With this construction each shaft-section is permitted a partial revolution (as here shown substantially a half-revolution) before the next succeeding shaft-section begins to rotate. I provide the standards 37 for each shaft-section, (see Fig. 8,) and upon each of said shaft-sections I arrange an eccentric 38, upon which is mounted, so as to turn freely thereon, a disk or pulley 39. The disks 39 are each free to rotate upon the corresponding eccentric 38, such rotation changing the position of said disk or pulley in relation to the platform upon which the shaft-bearing standards 37 are secured. Secured to the shaft-section 31 in proximity to each disk 39 is a suitable hub carrying two oppositely-projecting arms 40. This hub is fast on the shaft-section, so as to rotate therewith. Upon the face of the pulley 39 is a pivoted dog 41, having a long weighted arm 42. This arm is preferably pivoted between the face of the disk 39 and a lug 43 secured to the edge of said disk and extending over said arm. Arranged below said shaft and disk is an inclined block 44, and mounted in bearings in the shaft-standards 37 is a short shaft 45, having upon one end a crank-arm 46 and upon its other end a crank-arm 47. A small wheel 48 is arranged between the upper surface of the block 44 and the edge of the grooved disk or pulley 39. (See Figs. 4, 5, and 6.) A rod 49 connects the axis of this wheel with the crank-arm 47. A spring 50 is connected to the end of the crank 46 and to a pin or stud on one of the standards 37. (See Figs. 4 and 6.) The shaft 45 may be turned so as to carry the end of the crank-arm 46 above or below the center of the shaft, and when said shaft is turned so as to carry the end of the crank-arm 46 past the center the movement of said shaft will be completed by the spring 50, and said crank-arm will be held in either limit of its position by said pin. The end of the shaft 45 is also provided with an arm 51, extending upward and adapted to be raised into position in proximity to the face of the disk 39 opposite that to which the arm 41 is pivoted. (See Figs. 4, 5, and 6.) A lug 52 is provided on this face of the disk in position to engage the arm 51 when it stands in an upright position (see Fig. 4) and to move said arm downward as the disk 39 is rotated until the crank-arm 46 passes the center, when the tension of the spring 50 will turn the shaft 45 into the position shown in Fig. 6 of the drawings. It is also necessary to provide means for turning the shaft 45 into the reverse position when the shaft-sections 31 are given a reverse movement. For this purpose I provide a short shaft 53 in one of the standards 37 and upon the ends of this shaft arrange the arms 54 and 55. Upon a reverse movement of the shaft-section 31 the arm 54 will be engaged by the arm 40 on said shaft, and thereby the shaft 45 will be turned from the position shown in Fig. 6 to that shown in Fig. 4. When the parts stand in the position shown in Fig. 4, the wheel 48 is near the upper end of the block 37 and, resting upon said block, does not come in contact with the edge of the wheel or disk 39. When said parts are in the position shown in Fig. 6 of the drawings, the wheel 48 is drawn into engagement with the edge of the disk 39 and being wedged between the block 44 and the edge of said disk locks the disk in any position which it may occupy. A spring-dog 56 is arranged upon a platform in proximity to each disk 39 and in position to engage the short end of each pivoted arm 41. (See Fig. 4.)

A suitable cable 57 has one end attached to the disk 39, and said cable then passes over a guide-pulley 58, supported upon the beams 9, and is connected to the plow-beam by a link or coupling 60. Mounted loosely upon the first shaft-section are the two beveled or miter gears 61 and 62, and secured upon said shaft-section are the clutches 63 and 64. An idler miter-gear 65 is mounted upon a suitable support and meshes with the two gears 61 and 62. The shaft-sections are capable of a slight longitudinal movement in their bearings. A shifting-lever 66 is pivoted upon the frame of the machine and connected with one of said shaft-sections, (see Fig. 1,) and by means of this lever all of the shaft-sections can be moved longitudinally in their bearings, thereby locking either the pinion 61 or the pinion 62 to the shaft. The pinion 62 is rotated from the axle 3 by means of suitable sprocket-wheels and the chains 67 and 68. A suitable clutch 69, operated by a lever 70, is provided, so that said shaft may be at any time disconnected from the axle of the machine.

Operation: The parts being in the position shown in Fig. 4 of the drawings and it being desired to raise the plows, the lever 66 is moved into the position shown in Fig. 1 of the drawings, thereby locking the gear 62 to the shaft and causing said shaft to be rotated. The movement of the shaft by the lever 66 brings the arms 40 close to the face of the wheel or pulley 39 and into the plane of the pivoted arm 41. The wheels 39 will at this time all be standing in the position shown in Fig. 4 of the drawings, and the locking-wheel 48 will be out of contact with the face of the wheel 39. As the shaft rotates one of the arms 40 engages one end of the pivoted arm 41, (see dotted lines, Fig. 4,) and thereby the wheel 39 is caused to move with said arm and shaft. The cable 57 will be partially wound upon the edge of the disk or pulley 39, and the plow to which said cable is connected will be lifted from the ground. Just as the plow reaches the highest point to which it is desired to move it the arm 40 is disengaged from the arm 41, owing to the fact that the disk 39 turns upon the eccentric 38, while the arms 40 are turning with the shaft 31. At the same time the locking-wheel 48 is wedged between the block 44 and the edge of the wheel, and said wheel is locked in this position, thereby holding the plow in its highest or elevated position. Each disk 39 is operated in turn, and thereby all of the plows are raised from the ground and the raising mechanism is locked, thereby preventing the dropping of the plows until the operator desires to begin new furrows. When it is desired to return the plows to the ground, the lever 66 is moved to the opposite position, thereby moving all of the shaft-sections longitudinally and moving the arms 40 out of the plane of the arms 41 and into the planes of the arms 54. The locking-wheels are thereby released and the weight of the plows causes them to descend and the parts to be restored to their normal position, which is that shown in Figs. 4 and 5 of the drawings. The plows are returned to the ground in the same order in which they are raised—that is to say, the first plow is dropped first and the others in succession thereafter—so that the beginnings of the furrows are all in line with one another.

The details of the construction may obviously be varied in many particulars without departing from my invention.

I claim as my invention—

1. The combination, with a series of plows constituting a gang, means connected with said plows for moving the same, and power-operated means for lifting said plows in succession, clear of the ground upon which they are operating, substantially as described.

2. A gang-plow and power-operated means for raising the plows of the gang in succession, for the purpose set forth.

3. The combination, with a suitable platform and wheels supporting the same, of a gang of plows arranged to be drawn by said platform as the same is moved over the ground, and power-operated means arranged upon said platform for raising said plows in succession, substantially as described.

4. The combination, with a suitable platform and its supporting-wheels, of a series of plows connected with said platform and arranged to be drawn thereby, and means arranged upon said platform and operated from the axle thereof for lifting said plows in succession, substantially as described.

5. The combination, with a suitable platform and supporting-wheels therefor, of a gang of plows connected with said platform, and power-operated means arranged upon said platform for lifting said plows in succession from the ground, for the purpose set forth.

6. The combination, with a suitable platform and supporting-wheels therefor, of a series of plows arranged in the rear of said platform and connected therewith, a rotatable shaft arranged upon said platform and formed of a series of shaft-sections connected together by suitable couplings, means permitting each section to make a partial rotation before moving the next succeeding section, and a lifting mechanism arranged upon each of said sections and connected with the corresponding plow.

7. The combination, with a suitable frame or platform, of a series of plows connected therewith, a rotatable shaft arranged upon said frame or platform and formed of a series of shaft-sections connected together by suitable couplings, means permitting each section to make a partial rotation before moving the next succeeding section, a wheel or pulley upon each shaft-section, and connecting means between each pulley and the corresponding plow, substantially as described.

8. The combination, with a suitable platform and supporting-wheels therefor, of a series of plows arranged in the rear of said platform and connected therewith, a rotatable shaft arranged upon said platform and formed of a series of shaft-sections connected together by suitable couplings, means permitting each section to make a partial rotation before moving the next succeeding section, a wheel or pulley upon each shaft-section, a flexible connection between each pulley and the corresponding plow, and means for locking each pulley with the plow in an elevated position, substantially as described.

9. A gang-plow, and means for automatically raising the plows of the gang in succession, for the purpose set forth.

10. A gang-plow, and means, under the control of the operator, for automatically raising the plows of the gang in succession.

In witness whereof I have hereunto set my hand this 31st day of July, 1905.

WALTER GREGORY.

Witnesses:
A. C. PAUL,
C. G. HANSON.